United States Patent
Hamamura

(10) Patent No.: US 8,599,941 B2
(45) Date of Patent: Dec. 3, 2013

(54) DATA TRANSMISSION SYSTEM AND METHOD

(75) Inventor: Masanori Hamamura, Kami (JP)

(73) Assignee: Kochi University of Technology, Kami, Kochi (JP)

( * ) Notice: Subject to any disclaimer, the term of this patent is extended or adjusted under 35 U.S.C. 154(b) by 716 days.

(21) Appl. No.: 12/262,644

(22) Filed: Oct. 31, 2008

(65) Prior Publication Data

US 2010/0111205 A1   May 6, 2010

(51) Int. Cl.
*H04L 27/28*   (2006.01)
(52) U.S. Cl.
USPC ........... 375/260; 375/259; 375/219; 375/295; 375/316; 455/59
(58) Field of Classification Search
USPC ............. 375/260, 259, 219, 295, 316; 455/59
See application file for complete search history.

(56) References Cited

U.S. PATENT DOCUMENTS

| | | | |
|---|---|---|---|
| 7,447,268 B2 * | 11/2008 | Sadowsky et al. ............ | 375/260 |
| 2004/0008616 A1 * | 1/2004 | Jung et al. .................... | 370/203 |
| 2005/0220199 A1 * | 10/2005 | Sadowsky et al. ............ | 375/260 |
| 2006/0215540 A1 * | 9/2006 | Krishnamoorthi et al. ... | 370/208 |
| 2007/0121676 A1 * | 5/2007 | Koga et al. .................... | 370/482 |
| 2009/0041092 A1 * | 2/2009 | Kim et al. ..................... | 375/146 |
| 2009/0109835 A1 * | 4/2009 | Green ............................ | 370/210 |
| 2009/0220019 A1 * | 9/2009 | Kwon et al. ................... | 375/261 |
| 2009/0310699 A1 * | 12/2009 | Kodama et al. ............... | 375/267 |
| 2010/0074349 A1 * | 3/2010 | Hyllander et al. ............ | 375/260 |

OTHER PUBLICATIONS

You, Y-H, et al., "PAPR Analysis in OFDM Systems with Frequency Diversity," *IEICE Trans. Commun.*, vol. E88-B, No. 6, Jun. 2005, pp. 2660-2663.
Frenger, P.K., et al., "Parallel Combinatory OFDM Signaling," *IEEE Transactions on Communications*, vol. 47, No. 4, Apr. 1999, pp. 558-567.
Sasaki, S., et al., "Multiple Access Performance of Parallel Combinatory Spread Spectrum Communication Systems in Nonfading and Rayleigh Fading Channels," *IEICE Trans. Commun.*, vol. E78-B, No. 8, Aug. 1995, pp. 1152-1161.
Park, S.Y., et al., "Performance of Multi-Carrier Parallel Combinatory DS-CDMA System," *IEICE Trans. Commun.*, vol. E81-B, No. 9, Sep. 1998, pp. 1758-1769.
Hamamura, M., et al., "Bandwidth Efficiency Improvement for Multi-Carrier Systems," *Proc. IEEE*, PIMRC2004, Barcelona, Spain, Sep. 2004, pp. 48-52.
Hou, Y., et al., "A Novel Modulation with Parallel Combinatory and High Compaction Multi-Carrier Modulation," *IEICE Trans. Fundamentals*, vol. E90-A, No. 11, Nov. 2007, pp. 2556-2567.
Aulin, T., et al., "Continuous Phase Modulation—Part I: Full Response Signaling," *IEEE Transactions on Communications*, vol. Com.-29, No. 3, Mar. 1981, pp. 196-209.
Proakis, G., "Chapter Four: Characterization of Communication Signals and Systems," from *Digital Communications*, $4^{th}$ ed., McGraw-Hill, 2001, pp. 184-192.
Sklar, B., "1.7: Bandwidth of Digital Data, from Chapter One: Signals and Spectra," *Digital Communications*, $2^{nd}$ ed., Prentice Hall, pp. 45-49, 2001.
Hayashi, R., et al., "Performance of Continuous-Phase, Unmodulated Parallel-Combinatory High-Compaction Multicarrier Modulation," *Wireless Communications and Mobile Computing Conference*, IWCMC '08, Aug. 6-8, 2008, pp. 195-199.

* cited by examiner

*Primary Examiner* — Kenneth Lam
(74) *Attorney, Agent, or Firm* — Foley & Lardner LLP

(57) ABSTRACT

Continuous-phase high compaction multicarrier-modulation (CPPC/HC-MCM) according to the present application uses a continuous phase modulation (CPM) technique to prevent an amplitude gap between two continuous signals, thereby improving characteristics of the conventional PC/HC-MCM in terms of effective use of a frequency bandwidth. The CPPC/HC-MCM can achieve a lower bit error rate (BER) for a wide signal-to-noise ratio at a common spectral efficiency of about 0.33 or less, as compared to the conventional unmodulated PC/HC-MCM.

25 Claims, 10 Drawing Sheets

DATA TRANSMISSION SYSTEM AND METHOD

BACKGROUND

Spectral efficiency provides the ability to transmit data at high speed with a fixed frequency bandwidth. The spectral efficiency is an important parameter for designing wireless communication systems. Orthogonal frequency division multiplexing (OFDM) achieves high spectral efficiency, and has robustness against inter symbol interference (ISI) caused by channel multipath. One major drawback of the OFDM is the high peak-to-average power ratio (PAR) of transmission signals. PC-OFDM has been proposed using parallel combinatory (PC) signaling technique to reduce the PAR, to improve the spectral efficiency, and to reduce the bit-error rate (BER).

High-compaction multicarrier modulation (HC-MCM) has also been proposed to improve the spectral efficiency at the expense of BER performance. The HC-MCM is configured to transmit a truncated version of the OFDM signal. Thus, amplitude discontinuities between two successive signal waveforms appear and result in unnecessary frequency bandwidth expansion.

On the other hand, parallel combinatory HC-MCM (PC/HC-MCM) has been proposed to improve the BER of the HC-MCM and to reduce the PAR. However, the PC/HC-MCM also contains the problem of discontinuities in the waveforms as in the HC-MCM. Thus, it is desirable to reduce the unnecessary frequency bandwidth expansion by preventing amplitude gaps in the PC/HC-MCM signal waveforms.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
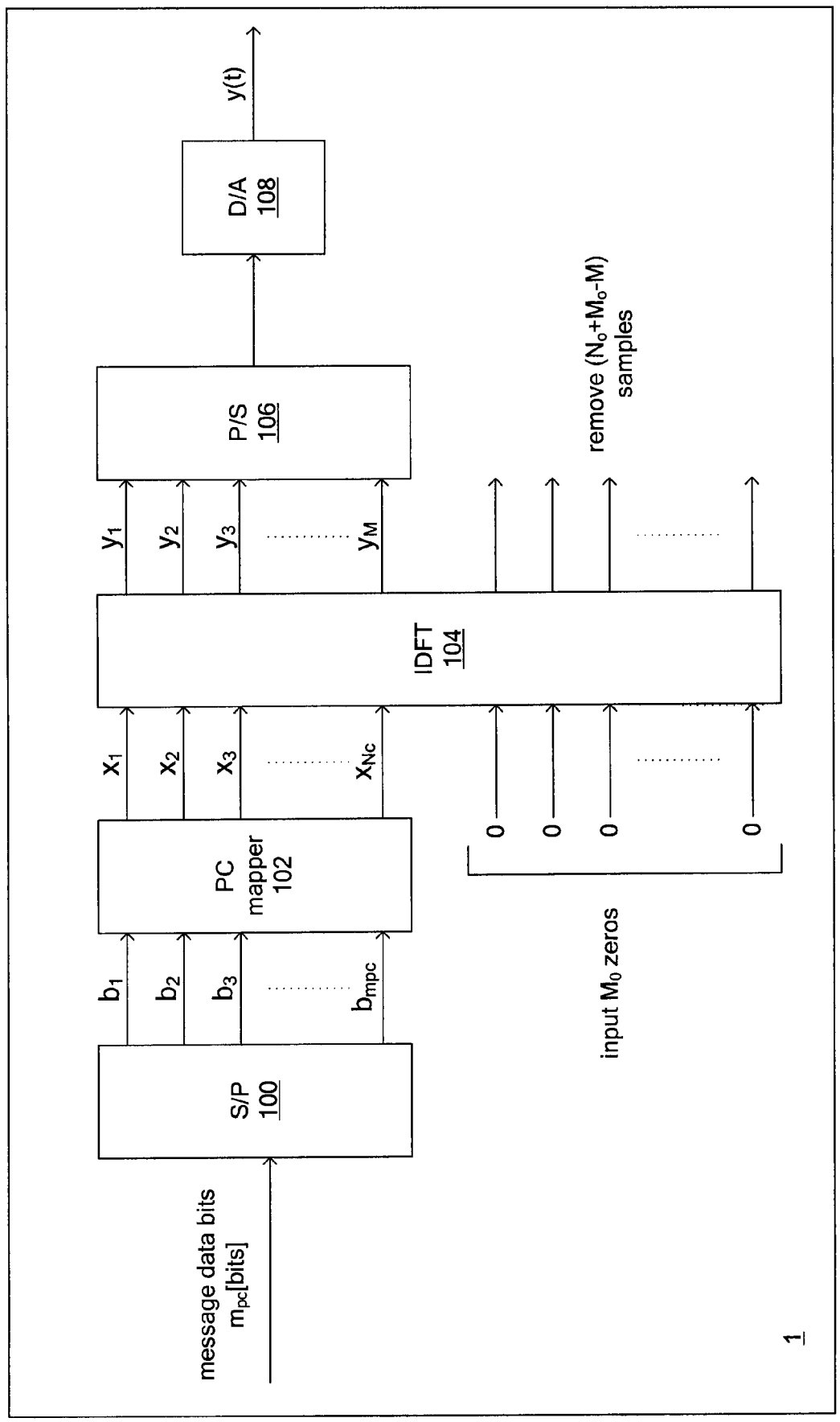
FIG. 1 is a diagram showing a first transmitter using an Inverse Discrete Fourier Transform (IDFT) to generate a PC/HC-MCM transmission signal.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

First, PC-OFDM will be described. PC-OFDM is an OFDM that conveys message data with PC signaling, together with an ordinary M-ary (where M is generally a symbol representing an integer which is a power of two) amplitude and phase shift keying (M-APSK).

Unless specifically stated otherwise, as apparent from the following discussion, it is understood that throughout the present discussions terms such as "receiving," "outputting," and "transmitting" refer to the action and processes of a computer system or similar electronic computing device. The computer system or similar electronic computing device manipulates data represented as physical (electronic) quantities within the computer system's registers and memories, and converts the data into other data similarly represented as physical quantities within the computer system memories or registers, or other such information storage, transmission or display devices. Further, the present discussions are also suitable for the use of other computer systems such as, for example, optical and mechanical computers.

Hereinafter, the M-ary modulation will be further described taking FSK as an example. For example, in a binary (M=2) FSK modulation, two carriers $f_0$, $f_1$ are used. Data of 1 or 0 is transmitted depending on which one of the two carriers $f_0$, $f_1$ is transmitted. Similarly, in a quaternary FSK modulation, four carriers $f_0$ to $f_3$ are used. Data of (0, 0), (0, 1), (1, 0), or (1, 1) is transmitted depending on which one of the four carriers $f_0$ to $f_3$, is transmitted. The M-ary FSK modulation uses M carriers $f_0$ to $f_{M-1}$ to simultaneously transmit data of $m=\log_2 M$ bits, depending on which one of the carriers $f_0$ to $f_{M-1}$ is transmitted.

The PC signaling technique increases the number of bits of data that can be transmitted at one time by transmitting plural carriers combined with each other. For example, when two carriers selected from four carriers are transmitted and the other two carriers are not transmitted, there are $_4C_2=6$ combinations. For example, assuming that $N_{pc}$ carriers selected from $N_c$ carriers are transmitted and the other carriers are not transmitted using the PC signaling technique, it is possible to transmit $_{N_c}C_{N_{pc}}$ combinations of data at one time. Here, $_xC_y$ is the number of combinations of selecting x from y (x and y are positive integers, x≥y), and $_xC_y$ is hereinafter also referred to as (x/y) for clarity and simplification of the description. As described above, with the M-ary FSK modulation, it is possible to transmit 2 bits (4 combinations) of data at one time. While with the PC signaling technique, it is possible to transmit 6 combinations of data at one time. Further, for example, with the PC signaling technique for transmitting two carriers selected from eight carriers, it is possible to transmit (8/2)=28 combinations of data at one time.

Here, let $N_c$ be the total number of all preassigned carriers, and let $N_{pc}$ be the number of carriers selected for the PC signaling. In this case, the number of message data bits per PC-OFDM signal is given by the following Equation 1:

$$m_{total} = m_{apsk} + m_{pc} \quad (1)$$

Here, $m_{apsk}$ (bits) is the number of message data bits mapped to M-ary APSK constellations, for example, two points of ±1 for the BPSK and four points of ±1±j (j is an imaginary unit) for the QPSK, which is given by the following Equation 2:

$$m_{apsk} = N_{pc} \log_2 M \quad (2)$$

Here, $m_{pc}$ (bits) is the number of message data bits encoded into one of the predetermined set of $N_{pc}$ carriers. That is, the relationship among the total number of carriers $N_c$ used for transmission, $N_{pc}$ used for combination, and the number of message data bits $m_{pc}$, is given by the following Equations 3-1, 3-2:

$$m_{pc} \leq \|\log_2(N_c/N_{pc})\| \quad (3\text{-}1)$$

in general $$m_{pc} = \|\log_2(N_c/N_{pc})\| \quad (3\text{-}2)$$

Note that the operator $\|x\|$ used in the above Equations 3-1 and 3-2, denotes an integer equal to the operand x, or the largest integer smaller than the operand x.

The PC-OFDM is modeled by the following Equations 4, 5.

$$y(t) = \sum_{n=0}^{\infty} s^{(n)}(t - nT) \quad (4)$$

$$s^{(n)}(t) = \sum_{l=1}^{N_c} x_l^{(n)} e^{j2\pi(l-1)\Delta f t}, \quad 0 \leq t < 1/\Delta f, \quad (5)$$

Here, $x_l^{(n)}$ (l=1, 2, . . . , $N_c$) are complex symbols for a first carrier, which are arranged at (M+1)-ary APSK constellation which is one that zero amplitude is added to the ordinary M-ary APSK constellation. Further, in nT≤t<(n+1)T, T=1/Δf (sec.) is the duration of one PC-OFDM signal, and Δf (Hz) is the frequency spacing. Here, $m_{pc}$ message data bits can be transmitted without M-ary APSK in the PC-OFDM. In this case, $x_l^{(n)} = \{0, 1\}$, and $m_{total} = m_{pc}$.

Next, PC/HC-MCM will be described. PC/HC-MCM is categorized into two systems, modulated PC/HC-MCM and unmodulated PC/HC-MCM. The modulated PC/HC-MCM transmits a truncated signal. The unmodulated PC/HC-MCM transmits a truncated signal without the M-ary ASK modulation. Thus, the PC/HC-MCM signal can be modeled as shown in the following Equation 6.

$$s^{(n)}(t) = \sum_{l=1}^{N_c} x_l^{(n)} e^{j2\pi(l-1)\Delta f t}, \quad 0 \leq t < T, \quad (6)$$

Here, T<1/Δf.

Next, a description will be given of the unmodulated PC/HC-MCM that brings out a favorable property the PC/HC-MCM inherently contains. Hereinafter, the unmodulated PC/HC-MCM is simply referred to as PC/HC-MCM.

FIG. 1 is a diagram showing a first transmitter 1, using an Inverse Discrete Fourier Transform (IDFT) to generate a PC/HC-MCM transmission signal. As shown in FIG. 1, the first transmitter 1 includes a serial/parallel converter (S/P) 100, a PC mapper 102, an IDFT unit 104, a parallel/serial converter (P/S) 106, and a digital/analog converter (D/A) 108. Note that in the following drawings, substantially the same components are denoted by the same reference numerals.

With these components, the transmitter 1 generates the PC/HC-MCM signal. The transmitter 1 is implemented, for example, as software running on a signal processing device including a Digital Signal Processor (DSP) and an analog/digital converter (A/D). The S/P 100 converts $m_{pc}$ message data bits from a serial format to a parallel format, and outputs to the PC mapper 102.

The PC mapper 102, as described above on the PC signaling technique, performs mapping with 1 for the value of the output bits corresponding to the $N_{pc}$ carriers of combinations representing the parallel $m_{pc}$ message data bits from the S/P 100, and with 0 for the other value of the output bits, among $N_c$ complex symbols ($x_1, x_2, \ldots, x_{N_c}$). In this way, the $1^{st}$ to $N_c$-th inputs of the IDFT unit 104 are given. However, it is also possible to take a value other than 0 for the ($N_c$+1)-th to ($N_c + K_0$)-th inputs with appropriate transformation applied. Note that the number of carriers $N_c$, and the number of carriers $N_{pc}$ selected from the $N_c$ carriers, are selected so as to satisfy Equation 3 with respect to the number of message data bits $m_{pc}$. Further, the PC mapper 102 takes the value 0, as padding, for $K_0$ inputs which are the $N_c+1^{st}$ and subsequent inputs of the IDFT unit 104.

The IDFT unit 104 receives the mapped message data bits from the PC mapper 102 and performs an IDFT to convert the message data bits from the frequency domain into the time domain. As a result of the IDFT process, ($N_c+K_0$) samples are obtained. The IDFT unit 104 removes ($N_c+K_0-M$, where M≤$N_c+K_0$) samples of the obtained ($N_c+K_0$) samples, and outputs to the P/S 106 as the results of the inverse discrete Fourier transform ($y_1, y_2, \ldots, y_M$).

Note that a process of removing the ($N_c+K_0-M$) samples from the samples obtained as the results of the IDFT, corresponds, in the PC/HC-MCM, to truncation of the waveform by a rectangular window function in the time domain.

The P/S 106 converts the results of the inverse discrete Fourier transform ($y_1, y_2, \ldots, y_M$) input from the IDFT unit 104, from a parallel format to a serial format, and outputs them to the D/A 108. The D/A 108 converts the results of the serial inverse discrete Fourier transform input from the P/S 106, from a digital format to an analog format, and outputs them with a transmission signal y(t).

Figures 2A, 2B:
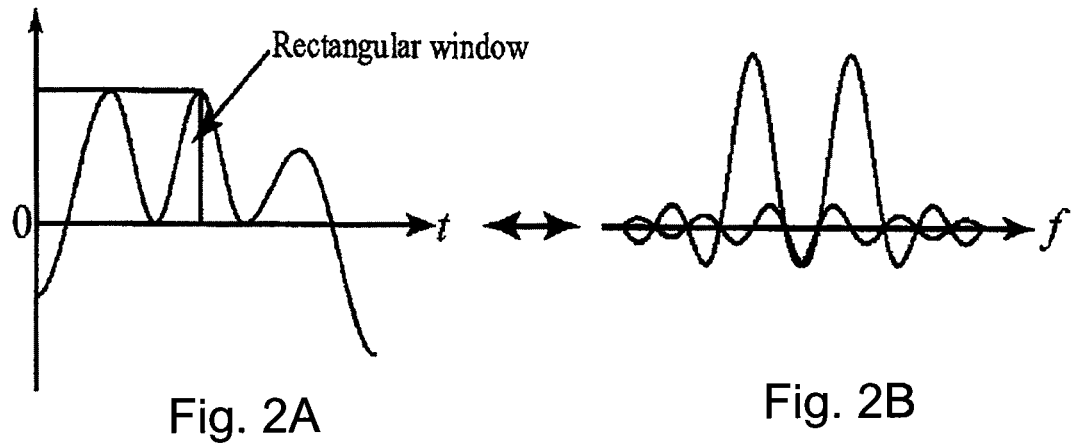
FIGS. 2A to 2F are diagrams showing waveforms of a transmission signal obtained by the transmitter shown in FIG. 1.
Figures 2C, 2D:
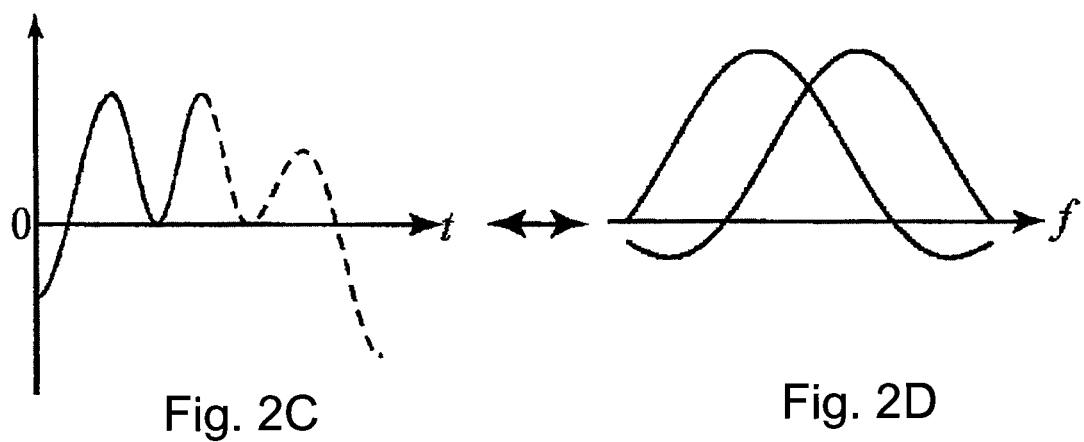
Figures 2E, 2F:
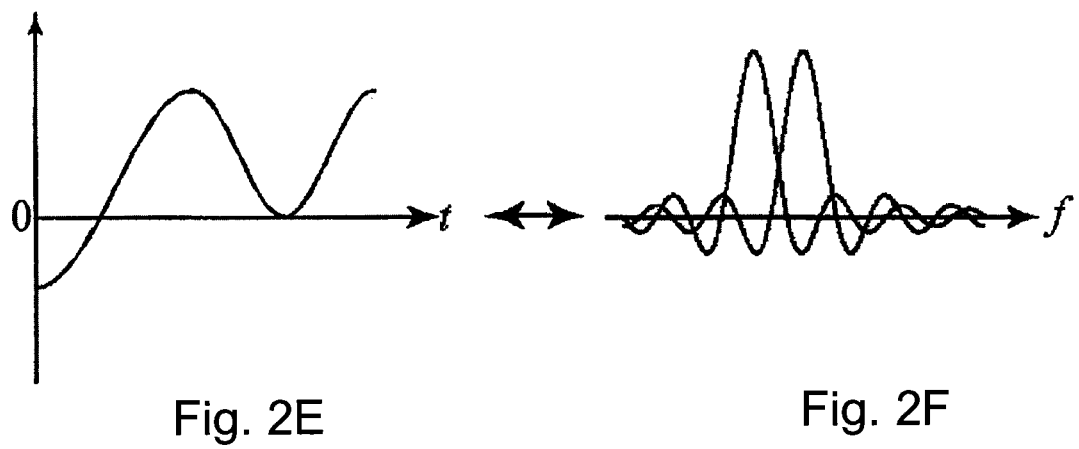

FIGS. 2A to 2F are diagrams showing waveforms of the transmission signal obtained by the transmitter 1 shown in FIG. 1. Note that, in the PC/HC-MCM, removal of the ($N_c + K_0 - M$) samples obtained as the results of the IDFT subjected to each of the symbols corresponds to truncation of the waveform by a rectangular window function in the time domain (see FIGS. 2A, 2C). Thus, the frequency bandwidth of transmission signal in the frequency domain obtained by the PC/HC-MCM expands as shown in FIGS. 2B, 2D. Expansion in the time axis direction corresponds to compaction in the frequency axis direction. Thus, with the PC/HC-MCM, as shown in FIGS. 2E, 2F, it is possible to obtain the same transmission rate as that of the PC-OFDM, with a narrower frequency domain.

As described above, the PC/HC-MCM truncates the waveform by the rectangular window function in the time domain. For this reason, only a portion indicated by the solid line in FIG. 2C is included in the waveform of the transmission signal of a certain (n-th) symbol, and a portion indicated by the dotted line is not included therein. When the same carrier is used for two symbols at a frequency that is integer times the reference frequency, no gap occurs between the waveform of the transmission signal of the n-th symbol and the waveform of the transmission signal of the next (n+1)-th symbol.

In the PC/HC-MCM, carriers having the same frequency are not necessarily used for each symbol. Further, the frequency of the carrier may not be integer times the reference frequency due to truncation of the waveform by the rectangular window function. Thus, a gap occurs between the waveform of the transmission signal of the n-th symbol and the waveform of the transmission signal of the next (n+1)-th symbol.

Here, a specific example is given of PC/HC-MCM transmission signals generated by selecting three carriers from eight carriers ($f_1$ to $f_8$) for each symbol (($N_c/N_{pc}$)=(8/3)). For example, it is assumed that the carriers $f_1$, $f_2$, $f_3$ are used for the transmission signal of the n-th symbol at a period that is integer times the fundamental period, and that the carriers $f_1$, $f_2$, $f_4$ are used for the transmission signal of the (n+1)-th symbol at a period that is integer times the fundamental period. There is no gap between the symbols in the waveforms of the carriers $f_1$, $f_2$ of the carriers included in the transmission signals of the two symbols. However, a gap occurs between the symbols in the waveforms of the other carriers thereof. Further, when the period of each carrier is not integer times the fundamental period due to truncation by the rectangular window function, a gap occurs between the symbols even in the waveforms of the carriers $f_1$, $f_2$ having the same frequency. The gap between the symbols in the waveforms of the transmission signals leads to an increase of the frequency bandwidth of the transmission signals.

Hereinafter, continuous phase parallel combinatory high-compaction multicarrier modulation (CPPC/HC-MCM) will be described. CPPC/HC-MCM is configured to prevent the increase of the frequency bandwidth of the transmission signals, by eliminating a possible gap between the symbols in the waveforms of the transmission signals for PC/HC-MCM. More specifically, taking the above example of ($N_c/N_{pc}$)=(8/3), for example when the carriers $f_1$, $f_2$, $f_3$ are used for the transmission signal of the n-th symbol, and when the carriers $f_1$, $f_2$, $f_4$ are used for the transmission signal of the (n+1)-th symbol, the CPPC/HC-MCM controls the phases of the carriers $f_1$, $f_2$, $f_4$ of the (n+1)-th symbol taking into account the truncation and continuously connects the waveforms of these carriers. This eliminates the gap between the symbols in the waveforms of the transmission signals, thereby preventing the increase of the frequency bandwidth.

Let $A=\{k \in N | 1 \le k \le N_c\}$ be the set of preassigned carriers, and let $B^{(n)}=\{b_1^{(n)}, b_2^{(n)}, \ldots, b_{Nc}^{(n)}\} \subset A(|B^{(n)}|=N_p)$ be the subset of A of the set of carriers used for the PC signaling in $nT \le t < (n+1)T$. To simplify the explanation, for example, $b_1^{(n)} < b_2^{(n)} < \ldots < b_{Npc}^{(n)}$. Further, $B^{(n)}$ is one of the possible subsets and includes $2^{mpc}$ elements (namely, $B^{(n)} \in C = \{B_1, B_2, \ldots, B_2^{mpc}\}$). In this case, Equation 6 representing the PC/HC-MCM signal can be rewritten as the following Equation 7:

$$s^{(n)}(t) = \sum_{l \in B^{(n)}} e^{j2\pi(b_l^{(n)}-1)\Delta ft}, 0 \le t < T. \quad (7)$$

The CPPC/HC-MCM signal is given by the following Equation 8.

$$s^{(n)}(t) = \sum_{l \in B^{(n)}} \zeta_{b_l^{(n)}} e^{j2\pi(b_l^{(n)}-1)\Delta ft}, 0 \le t < T, \quad (8)$$

In Equation 8, $\zeta_1^{(n)}(1 \in B^{(n)})$ is the phase shift (phase rotation) amount of the complex value $|\zeta_1^{(n)}|=1$, and is defined as shown in Equations 9-1 to 9-$N_{pc}$.

$$\zeta_{b_1}^{(n+1)} = \zeta_{b_1}^{(n)} \exp[(j2\pi b_1^{(n)}-1)\Delta fT] \quad (9\text{-}1)$$

$$\zeta_{b_2}^{(n+1)} = \zeta_{b_2}^{(n)} \exp[(j2\pi b_2^{(n)}-1)\Delta fT] \quad (9\text{-}2)$$

$$\zeta_{b_{Npc}}^{(n+1)} = \zeta_{b_{Npc}}^{(n)} \exp[(j2\pi b_{Npc}^{(n)}-1)\Delta fT] \quad (9\text{-}N_{pc})$$

In Equations 9-1 to 9-$N_{pc}$, it is assumed that $\zeta_1^{(0)}=1$ ($1 \in B^{(0)}$) for n=0.

As shown in Equations 9-1 to 9-$N_{pc}$, the CPPC/HC-MCM prevents a gap between the symbols in the waveforms of the transmission signals, by adjusting the phases $\zeta b_1^{(n+1)}$ to $\zeta b_{Npc}^{(n+1)}$ of each of the $1^{st}$ to $N_{pc}$-th carriers from the lowest to the highest frequencies included in the transmission signal of the (n+1)-th symbol, to the phases $\zeta b_1^{(n)}$ to $\zeta b_{Npc}^{(n)}$ of the $1^{st}$ to $N_{pc}$-th carriers from the lowest to the highest frequencies included in the transmission signal of the n-th symbol, at the boundary of the two symbols.

Note that it is also possible to adjust the phase of an arbitrary carrier included in the transmission signal of the n-th symbol, and the phase of an arbitrary carrier included in the transmission signal of the (n+1)-th symbol, with appropriate modification applied.

Here, Equation 7 is given by Equations 9-1 to 9-$N_{pc}$, where $\zeta_1^{(n)}=1(1 \in B^{(n)})$ with respect to all n. In other words, it will be understood that the PC/HC-MCM signal represented by Equation 7 is a special version of the CPPC/HC-MCM signal given by Equation 8 and Equations 9-1 to 9-$N_{pc}$, where $\zeta_1^{(n)}=1(1 \in B^{(n)})$ with respect to all n.

Figure 3:
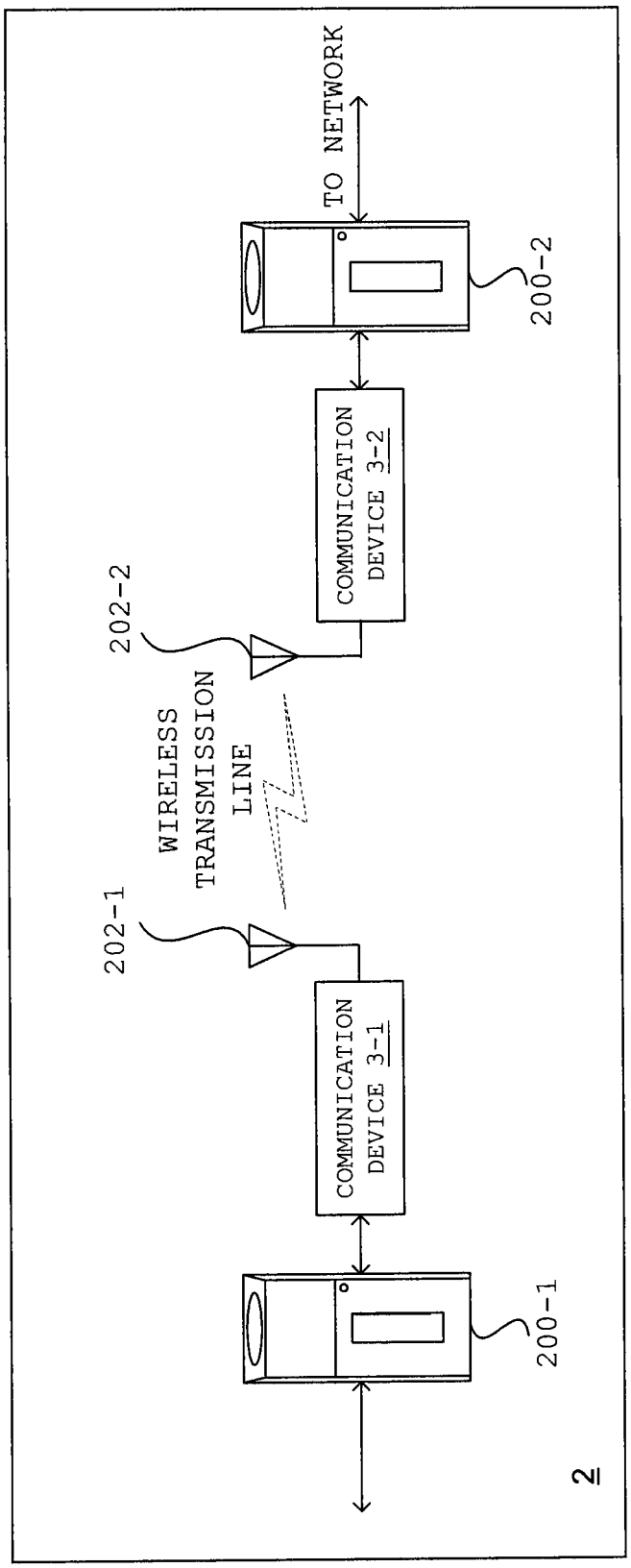
FIG. 3 is a block diagram of a CPPC/HC-MCM communication system shown in accordance with an example embodiment.

Hereinafter, a communication system 2 for generating the CPPC/HC-MCM signal will be described. FIG. 3 is a block diagram of the communication system 2 of CPPC/HC-MCM shown in accordance with an example embodiment. As shown in FIG. 3, the communication system 2 may include an information processing device 200-1 connected to a network and the like and to a communication device 3-1. Similarly, an information processing device 200-2 connected to a network and the like, is connected to a communication device 3-2 having substantially the same configuration as that of the communication device 3-1. The communication devices 3-1, 3-2 are connected to each other via a wireless transmission line and a first antenna 202-1 and a second antenna 202-2.

In the following description, when there can be plural components and any of the components, such as the information processing devices 200-1, 200-2, is represented without distinction between them, it is simply referred to as information processing device 200. The information processing device 200 is a computer that can be connected, for example, to the communication device 3 and the network or the like, to transfer message data therebetween.

Figure 4:
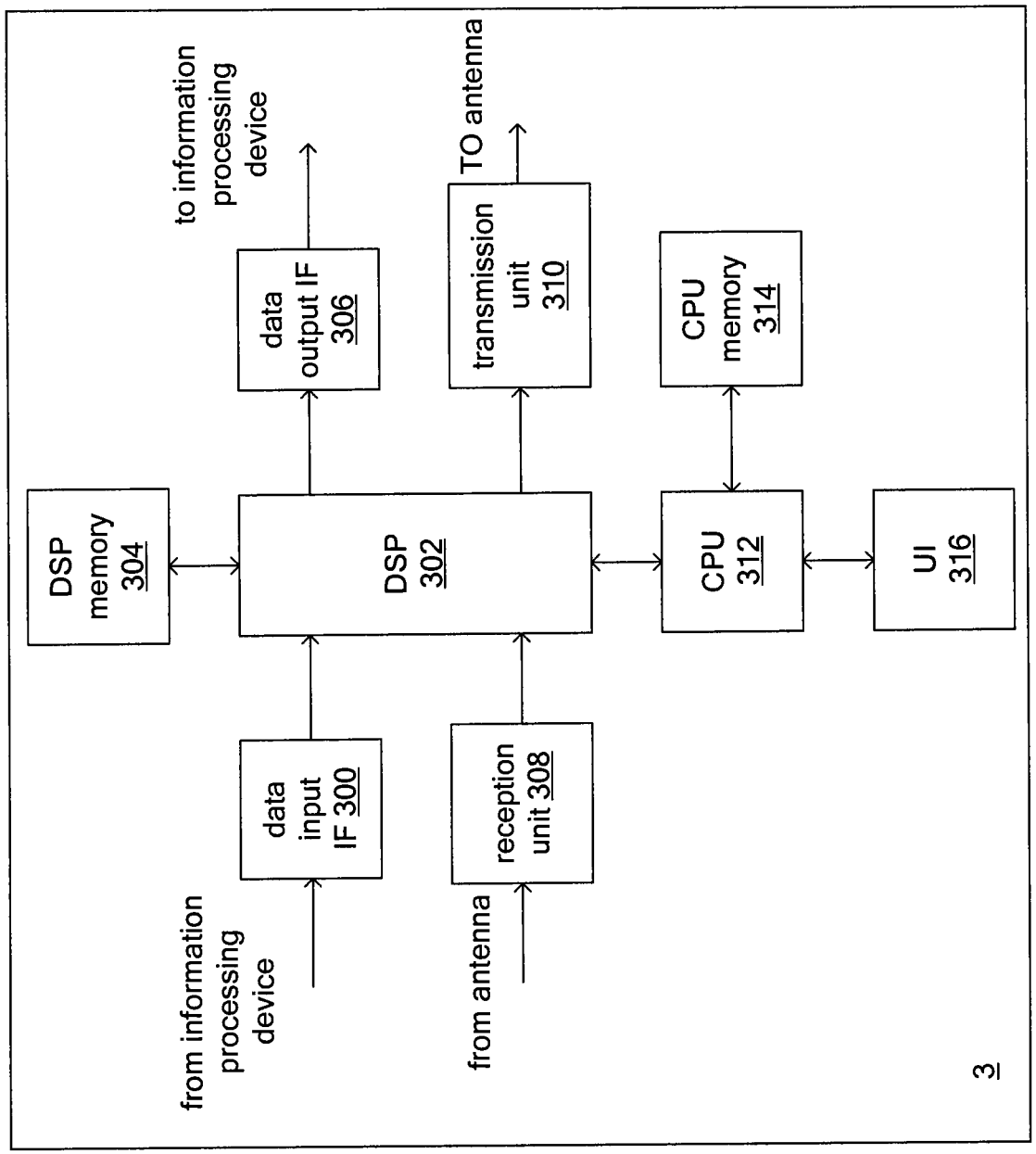
FIG. 4 is a hardware block diagram of the communication device shown in FIG. 3.

FIG. 4 is a hardware block diagram of the communication device 3 shown in FIG. 3. As shown in FIG. 4, the communication device 3 may include a data input interface (IF) 300; a digital signal processor (DSP) 302; a DSP memory 304; a data output interface 306 for transferring message data to the information processing device 200; a reception unit 308; a transmission unit 310; a CPU 312; a CPU memory 314; and a user interface unit (UI) 316. With the above components, the communication device 3 receives the message data, generates a CPPC/HC-MCM transmission signal, and transmits the transmission signal to the communication device 3 to be communicated via a wireless transmission line. Further, the communication device 3 receives the CPPC/HC-MCM transmission signal from the communication device 3 to be communicated via the wireless transmission line, combines the message data, and outputs them to the information processing device 200.

In order to make the description clearer and more concrete, it will be illustrated that the process of the communication device 3 is performed in a software manner. However, the process of the communication device 3 can also be implemented by dedicated hardware or a combination of dedicated hardware and software.

UI 316 provides an interface for receiving information from the user as known to those skilled in the art. UI 316 may interface with various input technologies including, but not limited to, a keyboard, a pen and touch screen, a mouse, a track ball, a touch screen, a keypad, one or more buttons, etc. to allow the user to enter information into communication device 3 or to make selections presented in a user interface displayed on a display. UI 316 may provide both an input and an output interface. For example, a touch screen both allows user input and presents output to the user. Communication device 3 may have one or more input interfaces that use the same or a different interface technology.

DSP memory 304 and/or CPU memory 314 are electronic holding places for storing information so that the information can be accessed by DSP 302 and/or CPU 312 as known to those skilled in the art. DSP memory 304 and/or CPU memory 314 can include, but are not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. Communication device 3 may have one or more computer-readable media that use the same or a different memory media technology. Communication device 3 also may have one or more drives that support the loading of a memory media such as a CD, a DVD, a flash memory card, etc.

DSP 302 and/or CPU 312 are processor that execute instructions as known to those skilled in the art. The instructions may be carried out by a special purpose computer, logic circuits, or hardware circuits. Thus, DSP 302 and/or CPU 312 may be implemented in hardware, firmware, software, or any combination of these methods. The term "execution" is the process of running an application or the carrying out of the operation called for by an instruction. The instructions may be written using one or more programming language, scripting language, assembly language, etc. DSP 302 and/or CPU 312 execute an instruction, meaning that they perform the operations called for by that instruction. DSP 302 and/or CPU 312 operably couple with data input interface (IF) 300, DSP memory 304, data output interface 306, reception unit 308, transmission unit 310, CPU memory 314, and/or UI 316 to receive, to send, and to process information. DSP 302 and/or CPU 312 may retrieve a set of instructions from a permanent memory device and copy the instructions in an executable form to a temporary memory device that is generally some form of RAM. 3 Communication device 3 may include a plurality of DSPs and/or CPUs that use the same or a different processing technology.

FIG. 3 shows an example of composition that the communication device 3 has the DSP 302 and the CPU 312. However, the communication device 3 can also be configured to have either the DSP 302 or the CPU 312, depending on the use of the communication device 3 and the desired performance, or other factors.

In the communication device 3, the data input interface 300 receives the message data from the information processing device 200, and outputs them to the DSP 302. The reception unit 308 receives the transmission signal of the transmission frequency bandwidth from the communication device 3 to be communicated via an antenna 202. Then, the reception unit 308 converts the received transmission signal into an analog baseband signal, and outputs it to the DSP 302.

The DSP 302 includes an A/D converter and a D/A converter, which are not shown. The DSP 302 executes transmission and reception programs (which will be described later with reference to FIGS. 5, 6) stored in the DSP memory 304. The DSP 302 modulates the digital message data received from the information processing device 200 with CPPC/HC-MCM to generate a baseband transmission signal, and outputs the baseband transmission signal to the transmission unit 310. The transmission unit 310 converts the digital baseband CPPC/HC-MCM transmission signal received from the DSP 302, into a transmission signal of the transmission frequency bandwidth, and transmits the transmission signal to the communication device 3 to be communicated via the information processing device 200. The CPU 312 executes the programs stored in the CPU memory 314, and controls the components of the communication device 3 by a user's operation through the user interface unit 316.

Figure 5:
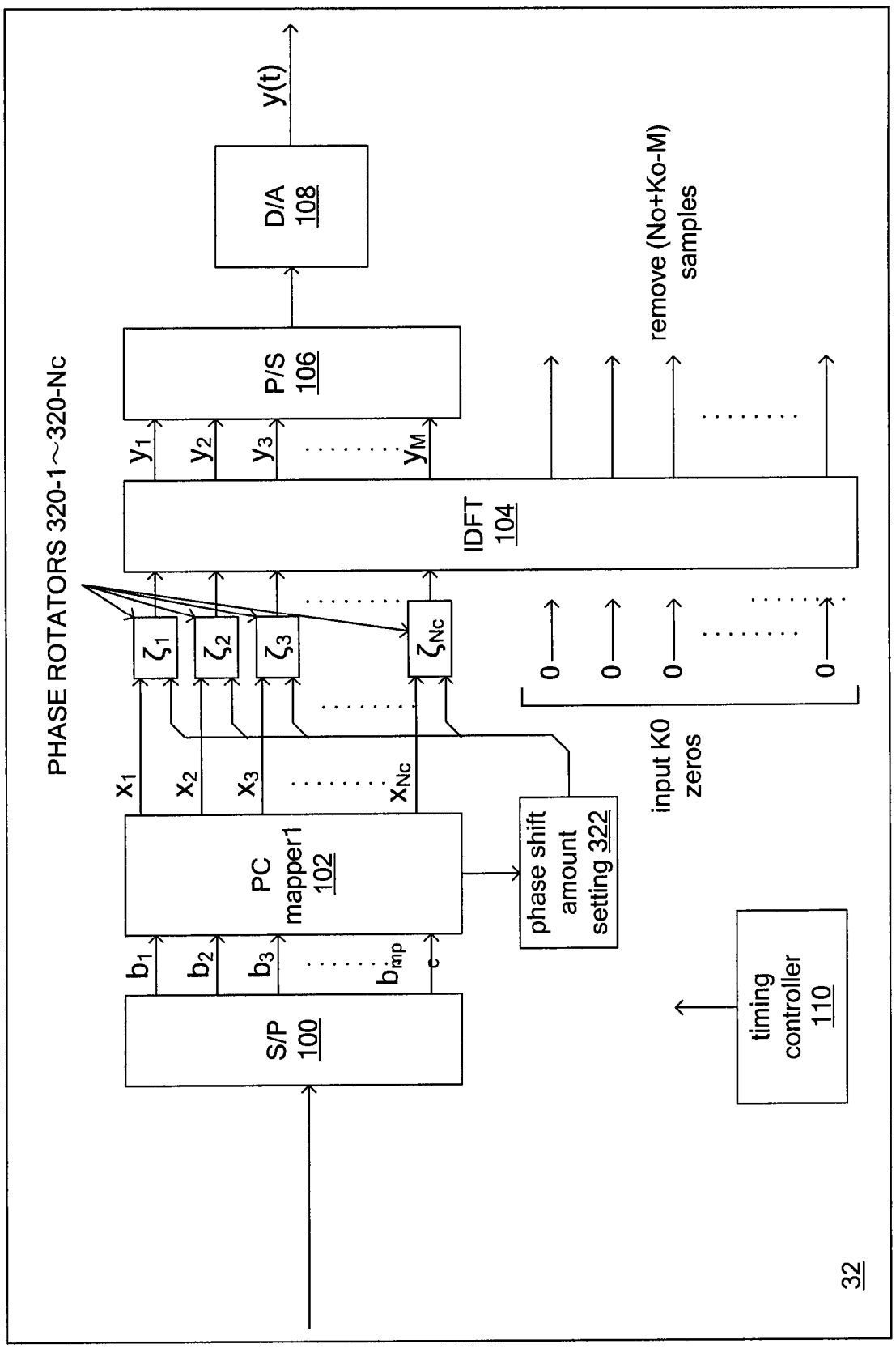
FIG. 5 is a block diagram showing a transmission program executed in the communication device shown in FIG. 3.

Next, a description will be given of a transmission program 32 for generating the CPPC/HC-MCM transmission signal by the IDFT and transmitting the transmission signal. FIG. 5 is a diagram showing a configuration of the transmission program 32 executed in the communication device 3 shown in FIG. 3 in accordance with an example embodiment. As shown in FIG. 5, the transmission program 32 includes the S/P 100, the PC mapper 102, phase rotators 320-1 to 320-$N_c$, a phase shift amount setting unit 322, the IDFT unit 104, the P/S 106, the D/A 108, and a timing controller 110.

The transmission program 32 is supplied, for example, to the communication device 3 via a network and the information processing device 200. The transmission program 32 is loaded into the DSP memory 304 or the CPU memory 314, and is executed on an operating system (OS) (not shown) running on the DSP 302 or on the CPU 312 using the hardware resources of the communication device 3. This is the same for the program described later. With the above components, the transmission program 32 modulates the message data received from the information processing device 200 with CPPC/HC-MCM, and generates analog baseband transmission data. Note that the numerical values M, $N_{pc}$, $N_c$, $K_0$ used in the transmission program 32 and the reception program 34, are adjusted to optimum values by calculations or actual measurements, according to the balance of the processing capacity of the communication device 3, the BER performance, the spectral efficiency, and the like.

The transmission program 32 and/or the reception program 34 may be implemented in software stored in a memory and accessible by a CPU or DSP for execution of the instructions that embody the operations of transmission program 32 and/or the reception program 34. The transmission program 32 and/or the reception program 34 may be written using one or more programming languages, assembly languages, scripting languages, etc.

In the transmission program 32, the timing controller 110 controls the operation timing of each component of the transmission program 32. The S/P 100, as described above on the transmitter 1 shown in FIG. 1, receives $m_{pc}$ serial message data bits, and outputs them to the PC mapper 102 as $m_{pc}$ parallel message data bits.

As described above, the PC mapper 102 maps the $m_{pc}$ parallel message data bits into a set of $N_{pc}$ carriers of $N_c$ carriers, giving complex symbols $(x_1, x_2, \ldots, x_{Nc})$ as the $1^{st}$ to $N_c$-th inputs of the IDFT unit 104. Also, the PC mapper 102 takes the value 0, as padding, for $K_0$ inputs which are the $N_c+1^{st}$ and subsequent inputs of the IDFT unit 104. Further, the PC mapper 102 outputs information of which carriers to be used for each complex symbol $x_1$, of all the $N_c$ carriers, to the phase shift amount setting unit 322.

The phase shift amount setting unit 322 sets the phase shift amounts $\zeta b_1$ to $\zeta b_{Npc}$ to the phase rotator 320-1 in response to a user's operation, for example via the user interface unit 316, which is set to the $N_{pc}$ phase rotators 320 corresponding to the $1^{st}$ to $N_{pc}$-th carriers to be transmitted in the transmission signal of a certain complex symbol $x_1$, according to Equations 9-1 to 9-$N_{pc}$ based on the information from the PC mapper 102. The phase rotator 320-1 multiplies the complex symbol $x_{i1}$ $(\exp[j2\pi(b_1^{(n)}-1)\Delta ft]$ shown in Equations 7, 8) input from the PC mapper 102, by $\zeta b_1$ defined by Equations 9-1 to 9-$N_{pc}$. The result is the first input of the IDFT unit 104.

The phase rotator 320 shifts the phases of the carriers included in the transmission signal of the complex symbol $x_1$ by multiplying the complex symbol $x_1$ by the phase shift amount $\zeta_1$. More specifically, the phase shift amount unit 322 sets the phase shift amounts given by Equations 9-1 to 9-$N_{pc}$ to the phase rotator 320, and the phase rotator 320 shifts the phases of the carriers included in the transmission signal by the phase shift amounts. In this way, the phases of the $1^{st}$ to $N_{pc}$-th carriers included in the transmission signal are controlled to be continuously connected at the boundary of the carrier signal of the complex symbol $x_1$ and the carrier signal of the next complex symbol $x_{1+1}$.

The IDFT unit 104 is configured to receive $N_c+K_0$ symbols and output $N_c+K_0$ samples. The IDFT unit 104 receives $N_c$ complex symbols $x_1$ to $X_{Nc}$ from the phase rotators 320-1 to 320-$N_c$ for the $1^{st}$ to $N_c$ inputs, and receives the value 0 for the $(N_c+1)$-th to $(N_c+K_0)$-th inputs. The IDFT unit 104 performs an inverse discrete Fourier transform (IDFT) on these inputs. Then, the IDFT unit 104 outputs only the $1^{st}$ to M-th samples $y_1$ to $y_M$, of the samples in the time domain obtained as the result of the IDFT, while eliminating the remaining $(N_c+K_0-M)$ samples.

Note that it is also possible to configure the transmission program 32 to support a change in the number of complex symbols, by increasing the number of stages of the S/P 100, and placing the phase rotators 320 before the $(N_c+1)$-th to $(N_c+K_0)$-th inputs of the IDFT unit 104, respectively, so that the phase shift amounts can also be set to such phase rotators 320 by the phase shift amount setting unit 322. In this case, the value 0 is set to the $(N_c+1)$-th to $(N_c+K_0)$-th inputs of the IDFT unit 104, if outputs corresponding to the inputs are provided from the S/P 100, by multiplying the corresponding outputs by 0 as the phase shift amount $\zeta b_1$ (where 1 does not belong to $B^{(n)}$).

The P/S 106, as described above, converts the samples $y_1$ to $y_M$ received from the IDFT unit 104 via the phase rotators 320, from a parallel format to a serial format, and outputs them to the D/A 108. The D/A 108, as described above, converts the serial samples $y_1$ to $y_M$ received from the P/S 106, from a digital format to an analog format to generate a baseband CPPC/HC-MCM transmission signal y(t), and outputs them to the transmission unit 310.

Figure 6:
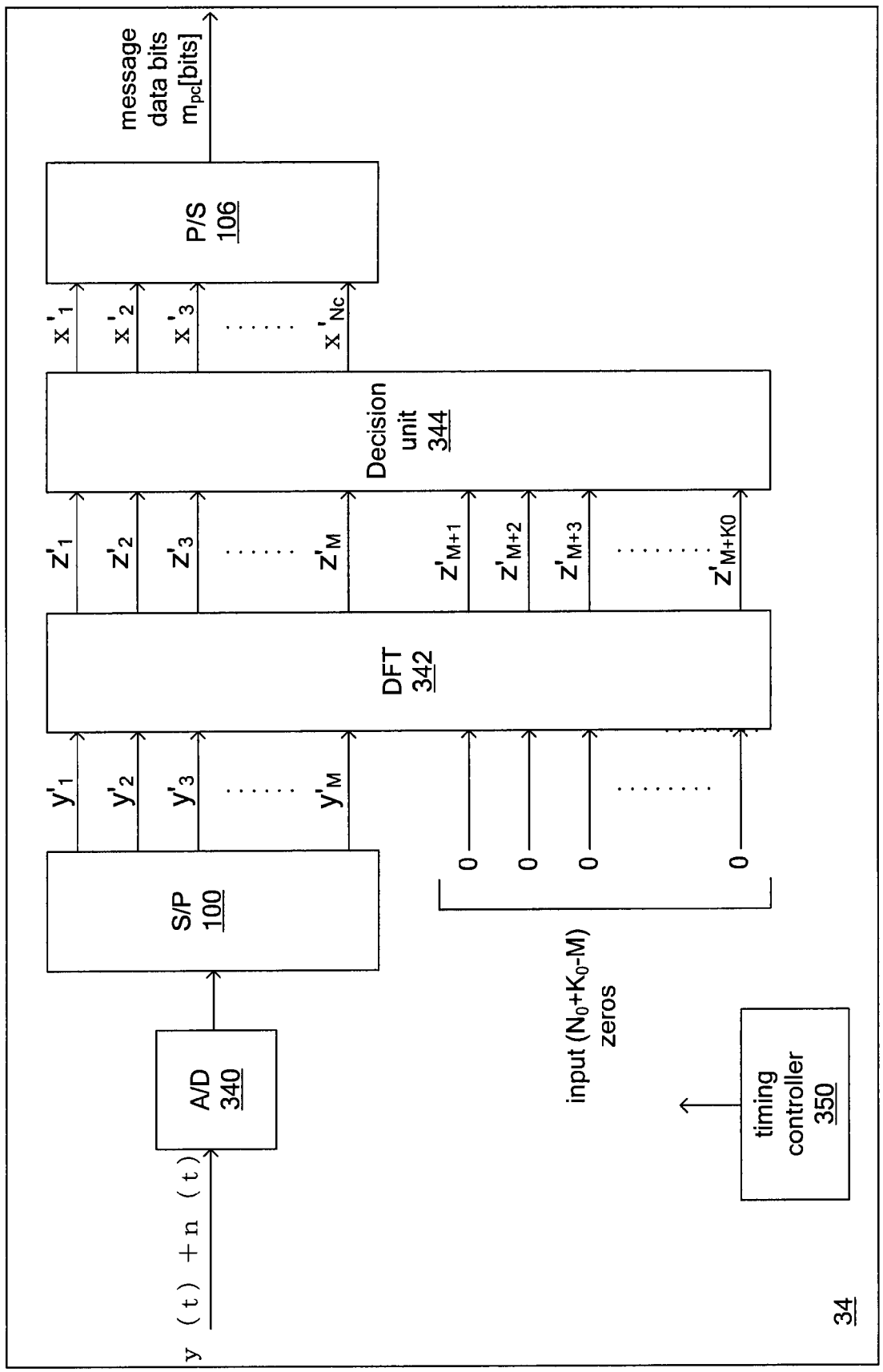
FIG. 6 is a block diagram showing a reception program executed in the communication device shown in FIG. 3.

Hereinafter, the reception program 34 will be described. The reception program 34 receives the transmission signal generated by CPPC/HC-MCM, via the wireless transmission line, and decodes the message data by the DFT. FIG. 6 is a diagram showing a configuration of the reception program 34 executed in the communication device 3 shown in FIG. 3 in accordance with an example embodiment. As shown in FIG. 6, the reception program 34 includes an A/D 340, S/P 100, discrete Fourier transform (DFT) unit 342, decision unit 344, P/S 106, and timing controller 350. With the above components, the reception program 34 receives the CPPC/HC-MCM transmission signal from the communication device 3 to be communicated, and decodes the message data.

As shown in FIG. 6, an unnecessary signal, such as, for example, an additive white Gaussian noise n(t) is superimposed on the transmission signal y(t) from the communication device 3 to be communicated in the wireless transmission line. In the reception program 34, the timing controller 350 controls the timing of the process of each component of the reception program 34. The transmission signal y(t)+n(t) is an analog baseband signal input from the reception unit 308 (FIG. 4), for example, with an additive white Gaussian noise n(t) added in the wireless transmission line. The A/D 340 converts the input transmission signal y(t)+n(t) from an analog format to a digital format, and outputs it to the P/S 106. The S/P 100 converts the digital transmission signal serially input from the A/D 340, into M parallel samples $y'_1$ to $y'_M$, and outputs is to the DFT unit 342.

The DFT unit 342 receives the samples $y'_1$ to $y'_M$ from the S/P 100 for the $1^{st}$ to M-th inputs, and receives samples of the value 0 for the remaining $(N_c+1)$-th to $(N_c+K_0)$-th inputs. However, the value of the $(M+1)$-th to $(N_c+K_0)$-th samples is not necessarily 0 with appropriate transformation applied. The DFT unit 342 performs a discrete Fourier transform (DFT) on the received samples in the time domain, generates $N_c+K_0$ samples $z'_1$ to $z'_{Nc+K0}$ in the frequency domain, and outputs them to the decision unit 344.

The decision unit 344 determines what PC (parallel combinatory) signal is transmitted from the communication device 3 to be communicated. The decision unit 344 performs a process corresponding to the PC mapper 102 of the transmission program 32 (FIG. 5). That is, the decision unit 344 determines that the $N_c+K_0$ samples $z'_1$ to $z'_{Nc+K0}$ input from the DFT unit 342, are most likely to correspond to which carriers of the set $B^{(n)}$ of all the carriers that can be used for the $m_{pc}$-bits message data.

The carrier set $B^{(n)}$ includes all combinations of $N_{pc}$ carriers that can be selected from 0 to $N_c$ carriers according to the $m_{pc}$-bits message data. The carrier index bits are integers indicating the $m_{pc}$ message data bits represented by the individual set $B^{(n)}$ of the carriers. The decision unit 344 makes this determination by searching the carrier set B' that satisfies the following Equation 10, from the set B∈C of all possible carriers.

$$\hat{B} = \operatorname*{argmin}_{B \in C}\left( J(B) = \sum_{k=1}^{N_c+K_0} |\hat{z}_k - z_{B,k}|^2 \right) \tag{10}$$

Here, "arg" is the deflection angle of the complex number, "arg min" means "minimizing the evaluation function." Further, $z_{b,k}$ (k=1, 2, . . . , $N_c+K_0$) are replica samples not containing noise. In other words, $N_c+K_0$ samples $z_{b,k}$ (k=1, 2, . . . , $N_c+K_0$) are the noiseless version of all frequency domain samples of the carrier set B∈C. That is, the noiseless replica samples $z_{b,k}$ can be defined as all the samples that can be obtained in such a manner that all the $m_{pc}$-bits message data bits are mapped by the PC mapper 102, subjected to the IDFT together with $K_0$ zeros by the IDFT unit 104, and subjected to the DFT together with ($N_c+K_0-M$) zeros by the DFT unit 342.

The replica samples $z_{b,k}$ respectively correspond to the complex symbols $x_1$ to $x_{Nc}$ generated by the transmission program 32 (FIG. 5). The replica samples $z_{b,k}$ exist as much as the complex symbols $x_1$ to $x_{Nc}$.

The decision unit 344 compares, as shown in Equation 10, the noiseless samples $z_{b,k}$ to the noise-containing samples $z'_{b,k}$ obtained from the received signal. As a result of the comparison, the decision unit 344 selects the noiseless samples $z_{b,k}$ that are most likely to be identical to the noise-containing samples $z'_{b,k}$. The decision unit 344 outputs, as described above, the symbols $x'_1$ to $x'_{Nc}$ mapped to the carriers included in the carrier set B', to the P/S 106 as decoding results. The P/S 106 converts the input symbols $x'_1$ to $x'_M$, from a parallel format to a serial format, thereby obtaining message data bits. The P/S 106 outputs the obtained message data bits to the data output interface 306 (FIG. 4). Note that the reception program 34 can be modified in various ways, such as an expansion in the number of stages of the S/P 100 and P/S 106.

Hereinafter, the overall operation of the communication system 2 shown in FIG. 3 will be described, assuming that the transmission signal is transmitted in the direction from the communication device 3-1 to the communication device 3-2. In the communication system 2, the message data bits are input to the DSP 302 from the network and the like, via the information processing device 200-1 as well as the user interface unit 316 (FIG. 3) of the communication device 3-1. The S/P 100 of the transmission program 32 (FIG. 5) executed in the DSP 302, converts the input message data bits from a serial format to a parallel format, and outputs them to the PC mapper 102.

The PC mapper 102 performs a mapping of the input message data bits, and generates complex symbols $x_1$ (1=1, 2, . . . , $N_c$). The IDFT unit 104 performs an IDFT process of which inputs are the complex symbols $x_1$ (1=1, 2, . . . , $N_c$) and $K_0$ zeros, and outputs M samples of the $N_c+K_0$ samples obtained as a result of the IDFT process, to the P/S 106. The P/S 106 converts the input samples from a parallel format to a serial format, and outputs them to the D/A 108.

The D/A 108 converts the serial input samples from a digital format to an analog format, and outputs them to the transmission unit 310 as a baseband transmission signal. The transmission unit 310 converts the baseband transmission signal input from the DSP 302 (transmission program 32) into a transmission signal y(t) having a frequency appropriate to the wireless transmission line (FIG. 3). The transmission unit 310 amplifies the transmission signal y(t), and transmits it to the communication device 3-2 via the first antenna 202-1 and the wireless transmission line.

In the communication device 3-2, the reception unit 308 (FIG. 4) receives the transmission signal from the communication device 3-1 via the second antenna 202-2. The reception unit 308 converts the transmission signal into a noise-containing baseband transmission signal y(t)+n(t), and outputs it to the DSP 302. The A/D 340 of the reception program 34 (FIG. 6) executed in the DSP 302, converts the input baseband signal from an analog format to a digital format, and outputs it to the S/P 100. The S/P 100 converts the serial input digital input transmission signal into parallel samples $y'_1$ to $y'_M$, and outputs them to the DFT unit 342.

The DFT unit 342 receives the samples $y'_1$ to $y'_M$ as the $1^{st}$ to M-th inputs, and receives the samples with the value 0 as the remaining (M+1)-th to ($N_c+K_0$)-th inputs. The DFT unit 342 performs a discrete Fourier transform (DFT) on the received samples to generate $N_c+K_0$ samples $z'_1$ to $z'_{Nc+K0}$, and outputs them to the decision unit 344. The decision unit 344 performs the process shown in Equation 10, with respect to the input samples $z'_1$ to $z'_{Nc+K0}$.

The decision unit 344 generates symbols $x'_1$ to $x'_{Nc}$ as a result of decoding the complex symbols $x_1$ to $x_{Nc}$ generated and transmitted by the PC mapper 102 of the transmission program 32 (FIG. 5). Then, the decision unit 344 outputs the generated symbols $x'_1$ to $x'_{Nc}$ to the P/S 106. The P/S 106 converts the symbols $x'_1$ to $x'_{Nc}$ from a parallel format to a serial format, and outputs them to the network and the like, via the data output interface 306 and the information processing device 200-2.

Hereinafter the performance of the CPPC/HC-MCM is evaluated. The computational complexity of maximum likelihood (ML) detection in the CPPC/HC-MCM can be reduced by selecting an integer as the value of $1/\Delta fT$. In this case, the computational complexity for the ML detection increases by a factor of $2^{1/\Delta fT}$, in comparison with the PC/HC-MCM. Further, in the following evaluation, the Gray code mapping is used as the PC mapper.

Table 1 shows an example for the case of $(N_c N_{pc})=(8/2)$.

TABLE I

| GRAY MAPPING | |
|---|---|
| Gray map | Freq |
| 0000 | $f_1, f_2$ |
| 0001 | $f_1, f_3$ |
| 0011 | $f_1, f_4$ |
| 0010 | $f_1, f_5$ |
| 0110 | $f_1, f_6$ |
| 0111 | $f_1, f_7$ |
| 0101 | $f_1, f_8$ |
| 0100 | $f_2, f_3$ |
| 1100 | $f_2, f_4$ |
| 1101 | $f_2, f_5$ |
| 1111 | $f_2, f_6$ |
| 1110 | $f_2, f_7$ |
| 1010 | $f_2, f_8$ |
| 1011 | $f_3, f_4$ |
| 1001 | $f_3, f_5$ |
| 1000 | $f_3, f_6$ |

There are several definitions for the bandwidth of signals. Popular measures are half-power bandwidth, null-to-null bandwidth, root mean square (RMS) bandwidth, and fractional power bandwidth. In the following evaluation, the discussion is made on the fractional power bandwidth of the CPPC/HC-MCM signals, which is measured using $2^{15}$-point DFT and is defined as the bandwidth containing 99% of the total power, or the 99% bandwidth.

Figure 7:
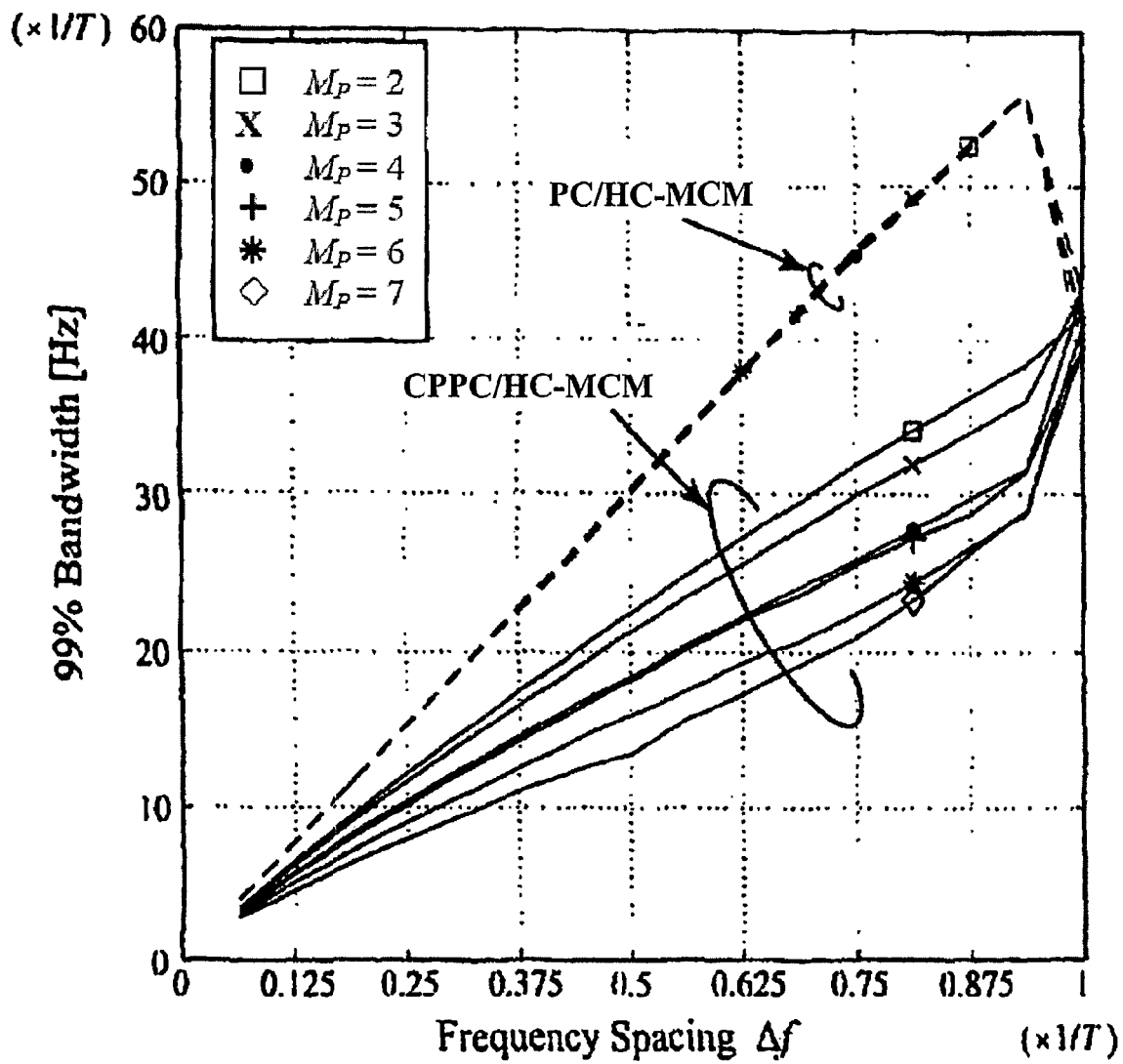
FIG. 7 is a diagram showing evaluation results of the bandwidth of the CPPC/HC-MCM transmission signal.

FIG. 7 is a diagram showing evaluation results of the bandwidth of the CPPC/HC-MCM transmission signal. As can be seen in FIG. 7, the CPPC/HC-MCM greatly reduces the bandwidth of the PC/HC-MCM. In the PC/HC-MCM (indicated by the dotted line in figures except FIG. 9), the bandwidth is the same regardless of the number of carriers $N_{pc}$. However, in the CPPC/HC-MCM (indicated by the solid line in figures except FIG. 9), the bandwidth varies depending on the number of carriers $N_{pc}$. The larger the number of carriers $N_{pc}$ the narrower the bandwidth, and the smaller the number of carriers $N_{pc}$ the wider the bandwidth.

For example, when $N_{pc}$ is 2 at a frequency spacing of $\Delta f=0.5T$, the 99% bandwidth of the CPPC/HC-MCM transmission signal is 22.5/T. Further, for example, when $N_{pc}$ is 7 at a frequency spacing of $\Delta f=0.5T$, the 99% bandwidth for $(N_c N_{pc})=(8/7)$ is 13.5/T, which is about half the bandwidth of the PC/HC-MCM transmission signal.

Figure 8:
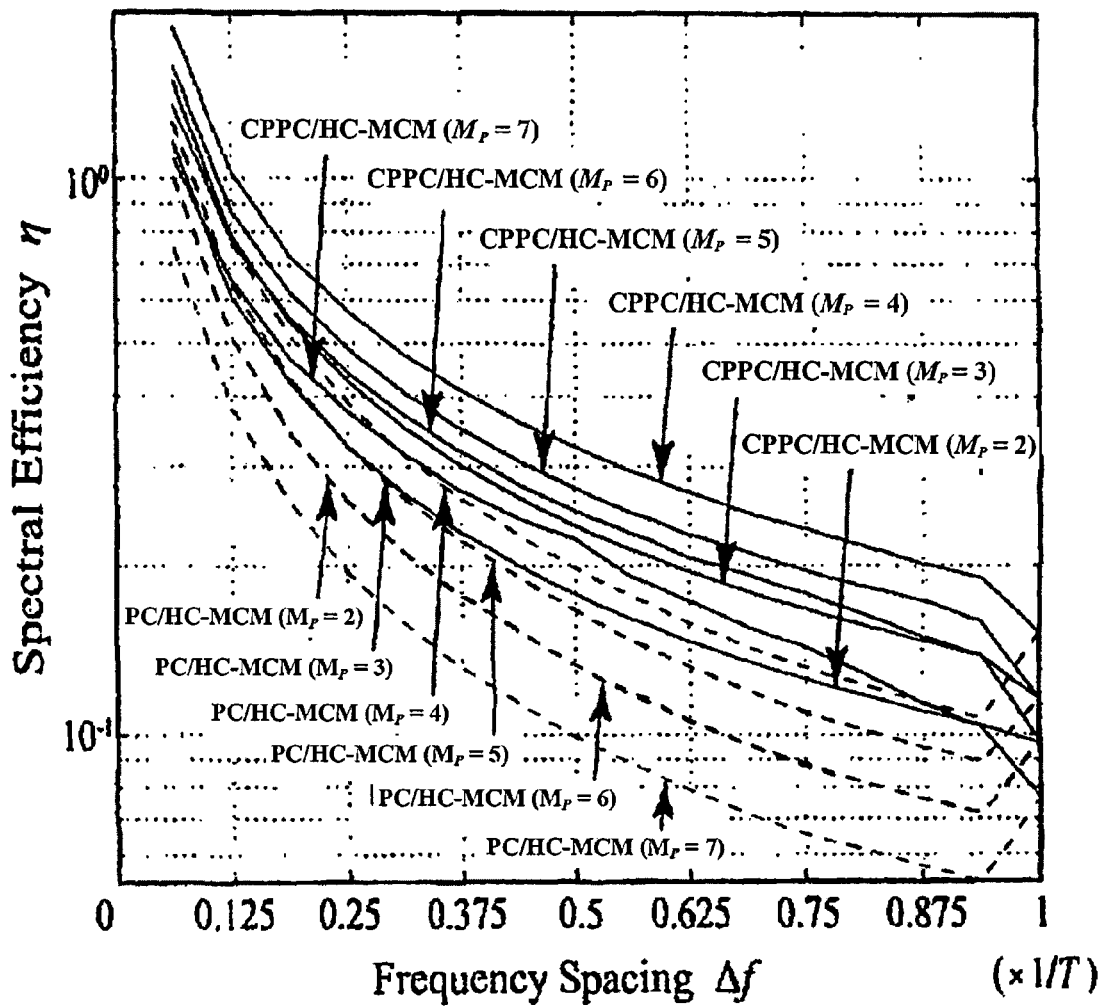
FIG. 8 is a diagram showing evaluation results of the spectral efficiency of the CPPC/HC-MCM transmission signal.

FIG. 8 is a diagram showing evaluation results of the spectral efficiency of the CPPC/HC-MCM. Here, the spectral efficiency η is defined by Equation 13 where $W_{99}$ denotes the 99% bandwidth.

$$\eta = \| \log_2(N_c/N_{pc}) \| / W_{99} T \quad (13)$$

As can be seen in FIG. 8, the spectral efficiency of the CPPC/HC-MCM transmission signal is higher than the spectral efficiency of the PC/HC-MCM transmission signal. It should be noted that the spectral efficiency of the PC/HC-MCM transmission signal indicated by the dotted line in FIG. 8, is equal to the spectral efficiency of the CPPC/HC-MCM transmission signal indicated by the solid line in FIG. 8. On the other hand, the spectral efficiency of the CPPC/HC-MCM transmission signal is different for $(N_c/N_{pc})$ and $(N_c/N_c-N_{pc})$. For example, the spectral efficiency of the CPPC/HC-MCM signal is η=0.18 at $\Delta f=0.5T$ for $(N_c/N_{pc})=(8/2)$, and η=0.25 at $\Delta f=0.5T$ for (8/6).

Figure 9:
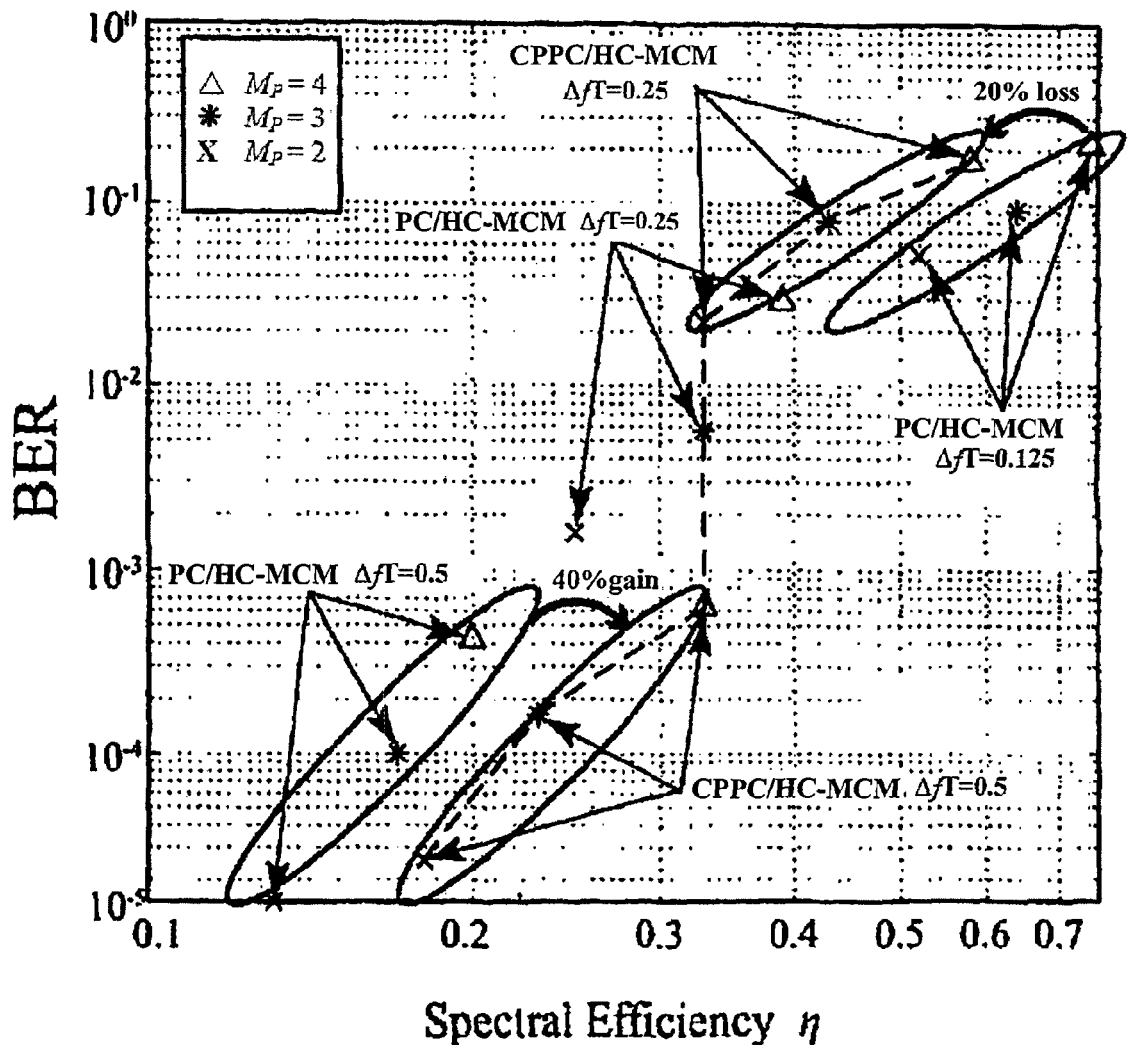
FIG. 9 is a diagram showing evaluation results obtained by simulation of BER versus spectral efficiency of the CPPC/HC-MCM transmission signal.

FIG. 9 is a diagram showing evaluation results obtained by simulation of BER versus spectral efficiency of the CPPC/HC-MCM transmission signal. Evaluation conditions are shown in Table 2 (II).

TABLE II

SPECIFICATIONS OF SIMULATIONS

| System Item | Parameter | | |
|---|---|---|---|
| Combination $\begin{pmatrix} M_c \\ M_p \end{pmatrix}$ | $\begin{pmatrix} 8 \\ 2 \end{pmatrix}$ | $\begin{pmatrix} 8 \\ 3 \end{pmatrix}$ | $\begin{pmatrix} 8 \\ 4 \end{pmatrix}$ |
| ΔfT (CPPC/HC-MCM) | 0.5, 0.25 | | |
| ΔfT (PC/HC-MCM) | 0.5, 0.25, 0.125 | | |
| $E_b/N_0$ | 10 dB | | |
| Bandwidth | 99% | | |
| PC Mapping | Gray Code Mapping | | |
| Noise | Additive White Gaussian Noise | | |
| Synchronization | Complete | | |

As can be seen in FIG. 9, with the spectral efficiency η being equal to or less than 0.33 in the same BER, spectral efficiency of the CPPC/HC-MCM transmission signal is improved by about 40% compared to that of the PC/HC-MCM transmission signal.

Figure 10:
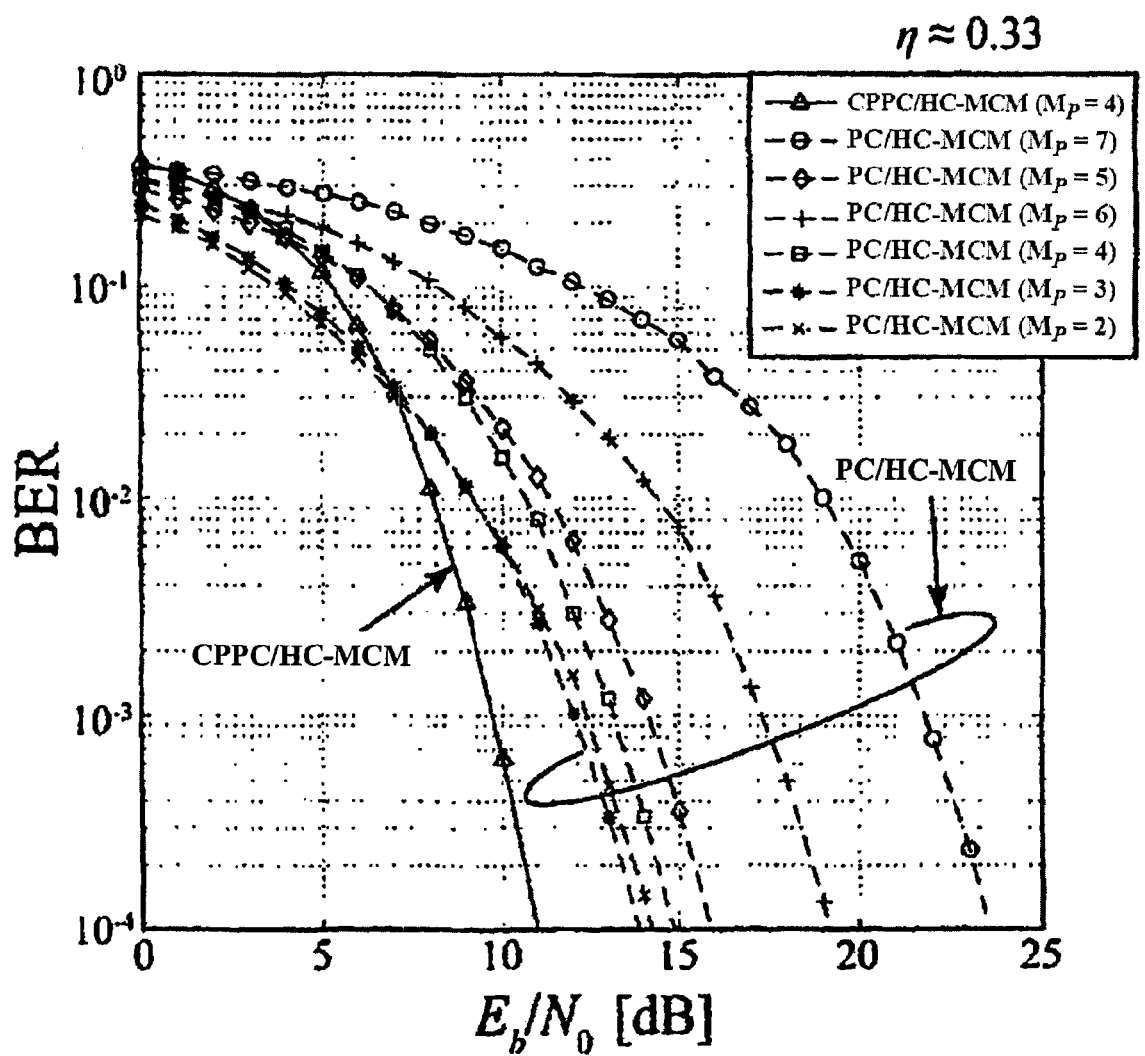
FIG. 10 is a diagram showing evaluation results obtained by simulation of BER versus $E_b/N_0$ of the CPPC/HC-MCM transmission signal.

FIG. 10 is a diagram showing evaluation results obtained by simulation of BER versus $E_b/N_0$ of the CPPC/HC-MCM transmission signal. Note that the evaluation shown in FIG. 10 was made under the conditions shown in Table III, with the spectral efficiency η being about 0.33 as shown in FIG. 9, using 4 as the number of carriers $N_{pc}$ so that the best spectral efficiency can be obtained.

TABLE III

SPECIFICATIONS OF SIMULATIONS

| System Item | Parameter | | | | | |
|---|---|---|---|---|---|---|
| Combination $\begin{pmatrix} M_c \\ M_p \end{pmatrix}$ | $\begin{pmatrix} 8 \\ 2 \end{pmatrix}$ | $\begin{pmatrix} 8 \\ 3 \end{pmatrix}$ | $\begin{pmatrix} 8 \\ 4 \end{pmatrix}$ | $\begin{pmatrix} 8 \\ 5 \end{pmatrix}$ | $\begin{pmatrix} 8 \\ 6 \end{pmatrix}$ | $\begin{pmatrix} 8 \\ 7 \end{pmatrix}$ |
| ΔfT (CPPC/HC-MCM) | — | 0.5 | | | — | |
| ΔfT (PC/HC-MCM) | 0.2 | 0.25 | 0.3 | 0.25 | 0.2 | 0.15 |
| Spectral Efficiency | 0.33 | | | | | |
| Bandwidth | 99% | | | | | |
| PC Mapping | Gray Code Mapping | | | | | |
| Noise | Additive White Gaussian Noise | | | | | |
| Synchronization | Complete | | | | | |

As shown in FIG. 10, a BER value of $10^{-3}$ was obtained with $E_b/N_0 \approx 9.7$ dB for the CPPC/HC-MCM transmission signal. The following are the conditions for the PC/HC-MCM transmission signal to obtain the same BER as of the CPPC/HC-MCM transmission signal:
1. $M_p=2$ with $E_b/N_0$ of 12.4 dB
2. $M_p=3$ with $E_b/N_0$ of 12.0 dB
3. $M_p=4$ with $E_b/N_0$ of 13.2 dB
4. $M_p=5$ with $E_b/N_0$ of 14.2 dB
5. $M_p=6$ with $E_b/N_0$ of 17.3 dB
6. $M_p=7$ with $E_b/N_0$ of 21.7 dB In the above 1 to 6 conditions, $E_b$ is the energy per data bit, $N_0$ is the one-side power spectral density of additive white Gaussian noise.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled", to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A communication system comprising:
a transmission device comprising
a first processor;
a first memory including first computer-readable instructions that, upon execution by the first processor, cause the transmission device to map first data comprising a predetermined number of bits to first symbols in a frequency domain representing a set of a first number of carriers corresponding to the first data, the first number of carriers being less than a second number of carriers used for transmission;

control a phase of the first symbols in a frequency domain, wherein the phases of the first symbols is controlled at a boundary of the first symbols;

convert the controlled first symbols and a third number of data values into time domain transmission signals; and convert the time domain transmission signals into a time domain transmission signal including a fourth number of data values; and a transmitter configured to transmit the time domain transmission signal to a reception device; and the reception device comprising a receiver configured to receive the transmitted time domain transmission signal from the transmission device;

a second processor; and a second memory including second computer-readable instructions that, upon execution by the second processor, cause the reception device to convert the received time domain transmission signal and a fifth number of data values into second samples in the frequency domain including a sixth number of data values that are sum of the fourth number of data values and the fifth number of data values; and decode the first data from the second samples based on a result of a comparison between the second samples and a set of third samples corresponding to the first data.

2. The communication system according to claim 1, wherein the first number of carriers comprises $N_c$, the second number of carriers comprises $N_{pc}$, and the predetermined number of bits comprises $m_{pc}$, and wherein $N_c$, $N_{pc}$, and $m_{pc}$ satisfy a relationship defined by $m_{pc} \leq \|\log_2(N_c/N_{pc})\|$ where the operator $\|x\|$ is an integer equal to an operand x or the largest integer smaller than the operand x.

3. The communication system according to claim 1, wherein the set of the third samples includes all of the third samples that can be obtained by performing the mapping, the first conversion, and the second conversion with respect to the values of all the first data to which the third number of data values are added.

4. The communication system according to claim 3, wherein the time domain transmission signal can be received with an unnecessary signal superimposed thereon, and the decoding compares the second samples with each of the third samples of the set of third samples and outputs the first symbols as decoding results, wherein the first symbols are represented by any of the third samples that are most likely to be identical to the second samples.

5. The communication system according to claim 1, wherein converting the controlled first symbols and the third number of data values into time domain transmission signals comprises performing an inverse discrete Fourier transform.

6. The communication system according to claim 5, wherein converting the controlled first symbols and the third number of data values into time domain transmission signals comprises a sixth number of inputs that is a second sum of the controlled first symbols and the third number of data values.

7. The communication system according to claim 1, wherein converting the received time domain transmission signal comprises performing a discrete Fourier transform.

8. The communication system according to claim 1, wherein the third number of data values have a first value of one and the fourth number of data values have a second value of zero, or third number of data values have a first value of zero and the fourth number of data values have a second value of one.

9. The communication system according to claim 8, wherein the transmission signal is defined by $$s^{(n)}(t) = \sum_{l \in B^{(n)}} \zeta_{b_l^{(n)}} e^{j2\pi(b_l^{(n)}-1)\Delta f t}, \; 0 \leq t < T,$$

where $T=1/\Delta f$ is a time length for transmitting the first data, $\Delta f$ is a frequency spacing, $B^{(l)}$ (l=1, 2, . . . , $m_{pc}$ as the first number) is a set of the second number of carriers selected from the first number of carriers to transmit the first data of the predetermined number of bits, $\zeta b_1^{(n+1)}$ to $\zeta b_{Npc}^{(n+1)}$ are complex numbers to be multiplied by the first data included in the (n+1)-th symbol of the first symbols and are defined by the following equations using phases, $\zeta b_1^{(n)}$ to $\zeta b_{Npc}^{(n)}$, of the carriers of the n-th symbol of the first symbols:

$\zeta b_1^{(n+1)} = \zeta b_1^{(n)} \exp[(j2\pi b_1^{(n)}-1)\Delta f T_1]$, $\zeta b_2^{(n+1)} = \zeta b_2^{(n)} \exp[(j2\pi b_2^{(n)}-1)\Delta f T_1]$, $\zeta b_{Npc}^{(n+1)} = \zeta b_{Npc}^{(n)} \exp[(j2\pi b_{Npc}^{(n)}-1)\Delta f T_1]$ where $T_1 = 1/\Delta f$ is a second time length of the transmission signal of one symbol, and $b_h^{(i)}$ ($1 \leq h \leq N_{pc}$, i=n, (n+1)) are the carriers included in the transmission signal.

10. The communication system according to claim 9, wherein controlling the phase includes controlling the phases $\zeta b_1^{(n+1)}$ to $\zeta b_{Npc}^{(n+1)}$ of each of the $N_{pc}$ carriers included in the transmission signal of the (n+1)-th symbol, using the phases $\zeta b_1^{(n)}$ to $\zeta b_{Npc}^{(n)}$ of each of the $N_{pc}$ carriers included in the transmission signal of the n-th symbol.

11. The communication system according to claim 1, wherein controlling the phase includes adjusting the phases by multiplying each of the first data included in the first symbols by a complex number.

12. A transmission device comprising:

a processor;

a memory including computer-readable instructions that, upon execution by the processor, cause the transmission device to map first data comprising a predetermined number of bits to first symbols in a frequency domain representing a set of a first number of carriers corresponding to the first data, the first number of carriers being less than a second number of carriers used for transmission;

control a phase of the first symbols in a frequency domain, wherein the phase of the first symbols is controlled at a boundary of the first symbols;

convert the controlled first symbols and a third number of data values into time domain transmission signals;

convert the time domain transmission signals into a time domain transmission signal including a fourth number of data values; and a transmitter configured to transmit the time domain transmission signal to a reception device.

13. The transmission device according to claim 12, wherein the first number of carriers comprises $N_c$, the second number of carriers comprises $N_{pc}$, and the predetermined number of bits comprises $m_{pc}$, and wherein $N_c$, $N_{pc}$, and $m_{pc}$ satisfy a relationship defined by $m_{pc} \leq \|\log_2(N_c/N_{pc})\|$ where the operator $\|x\|$ is an integer equal to an operand x or the largest integer smaller than the operand x.

14. The transmission device according to claim 12, wherein converting the received time domain transmission signal comprises performing a discrete Fourier transform.

15. The transmission device according to claim 14, wherein the third number of data values have a first value of one and the fourth number of data values have a second value of zero, or third number of data values have a first value of zero and the fourth number of data values have a second value of one.

16. The transmission device according to claim 12, wherein the third number of data values have a first value of one and the fourth number of data values have a second value of zero, or third number of data values have a first value of zero and the fourth number of data values have a second value of one.

17. The transmission device according to claim 12, wherein controlling the phase includes adjusting the phases by multiplying each of the first data included in the first symbols by a complex number.

18. The transmission device according to claim 17, wherein the transmission signal is defined by $$s^{(n)}(t) = \sum_{l \in B^{(n)}} \zeta_{b_l^{(n)}} e^{j2\pi(b_l^{(n)}-1)\Delta ft}, 0 \leq t < T,$$

where $T=1/\Delta f$ is a time length for transmitting the first data, $\Delta f$ is a frequency spacing, $B^{(1)}$ (l=1, 2, ..., $m_{pc}$ as the first number) is a set of the second number of carriers selected from the first number of carriers to transmit the first data of the predetermined number of bits, $\zeta b_1^{(n+1)}$ to $\zeta b_{Npc}^{(n+1)}$ are complex numbers to be multiplied by the first data included in the (n+1)-th symbol of the first symbols and are defined by the following equations using phases, $\zeta b_1^{(n)}$ to $\zeta b_{Npc}^{(n)}$, of the carriers of the n-th symbol of the first symbols:

$$\zeta b_1^{(n+1)} = \zeta b_1^{(n)} \exp[(j2\pi b_1^{(n)}-1)\Delta f T_1],$$

$$\zeta b_2^{(n+1)} = \zeta b_2^{(n)} \exp[(j2\pi b_2^{(n)}-1)\Delta f T_1],$$

$$\zeta b_{Npc}^{(n+1)} = \zeta b_{Npc}^{(n)} \exp[(j2\pi b_{Npc}^{(n)}-1)\Delta f T_1]$$

where $T_1 = 1/\Delta f$ is a second time length of the transmission signal of one symbol, and $b_h^{(i)}$ ($1 \leq h \leq N_{pc}$, i=n, (n+1)) are the carriers included in the transmission signal.

19. The transmission device according to claim 18, wherein controlling the phase includes controlling the phases $\zeta b_1^{(n+1)}$ to $\zeta b_{Npc}^{(n+1)}$ of each of the $N_{pc}$ carriers included in the transmission signal of the (n+1)-th symbol, using the phases $\zeta b_1^{(n)}$ to $\zeta b_{Npc}^{(n)}$ of each of the $N_{pc}$ carriers included in the transmission signal of the n-th symbol.

20. A transmission device comprising:
a processor; and
memory storing at least computer-readable instructions that, upon execution by the processor, cause the transmission device to
map first data comprising a predetermined number of bits to first symbols in a frequency domain representing a set of a first number of carriers corresponding to the first data, the first number of carriers being less than a second number of carriers used for transmission;
adjust a phase of the first symbols in a frequency domain, wherein the phase of the first symbols is controlled at a boundary of the first symbols;
convert the first symbols and a third number of data values into time domain transmission signals; and
convert the time domain transmission signals into a time domain transmission signal including a fourth number of data values.

21. A communication method comprising:
mapping first data comprising a predetermined number of bits to first symbols in a frequency domain representing a set of a first number of carriers corresponding to the first data, the first number of carriers being less than a second number of carriers used for transmission;
controlling a phase of the first symbols in a frequency domain, wherein the phase of the first symbols is controlled at a boundary of the first symbols;
converting the controlled first symbols and a third number of data values into time domain transmission signals;
converting the time domain transmission signals into a time domain transmission signal including a fourth number of data values;
transmitting the time domain transmission signal to a reception device;
converting the received time domain transmission signal and a fifth number of data values into second samples in the frequency domain including a sixth number of data values that are a sum of the fourth number of data values and the fifth number of data values; and
decoding the first data from the second samples based on a result of a comparison between the second samples and a set of third samples corresponding to the first data.

22. A transmission method comprising:
mapping first data comprising a predetermined number of bits to first symbols in a frequency domain representing a set of a first number of carriers corresponding to the first data, the first number of carriers being less than a second number of carriers used for transmission;
controlling a phase of the first symbols in a frequency domain, wherein the phase of the first symbols is controlled at a boundary of the first symbols;
converting the first symbols and a third number of data values into time domain transmission signals; and
converting the time domain transmission signals into a time domain transmission signal including a fourth number of data values.

23. A transmission method comprising:
mapping first data comprising a predetermined number of bits to first symbols in a frequency domain representing a set of a first number of carriers corresponding to the first data, the first number of carriers being less than a second number of carriers used for transmission;
adjusting each phase of the first data included in the first symbols in the frequency domain, wherein each phase of the first data is adjusted at a boundary of the first symbols;
converting the adjusted first symbols and a third number of data values into time domain transmission signals;
converting the time domain transmission signals into a time domain transmission signal including a fourth number of data values; and
transmitting the time domain transmission signal to a reception device.

24. A non-transitory computer-readable medium including computer-readable instructions that, upon execution by a processor, cause a device to perform functions comprising:
mapping first data comprising a predetermined number of bits to first symbols in a frequency domain representing a set of a first number of carriers corresponding to the first data, the first number of carriers being less than a second number of carriers used for transmission;

adjusting each phase of the first data included in the first symbols in the frequency domain, wherein each phase of the first data is adjusted at a boundary of the first symbols;

converting the adjusted first symbols and a third number of data values into time domain transmission signals;

converting the time domain transmission signals into a time domain transmission signal including a fourth number of data values; and transmitting the time domain transmission signal to a reception device.

25. A non-transitory computer-readable medium including computer-readable instructions that, upon execution by a processor, cause a device to:

map first data comprising a predetermined number of bits to first symbols in a frequency domain representing a set of a first number of carriers corresponding to the first data, the first number of carriers being less than a second number of carriers used for transmission;

control a phase of the first symbols in a frequency domain, wherein the phase of the first symbols is controlled at a boundary of the first symbols;

convert the first symbols and a third number of data values into time domain transmission signals; and convert the time domain transmission signals into a time domain transmission signal including a fourth number of data values.

* * * * *

UNITED STATES PATENT AND TRADEMARK OFFICE
CERTIFICATE OF CORRECTION

PATENT NO. : 8,599,941 B2  Page 1 of 1
APPLICATION NO. : 12/262644
DATED : December 3, 2013
INVENTOR(S) : Hamamura It is certified that error appears in the above-identified patent and that said Letters Patent is hereby corrected as shown below:

In the Specifications

In Column 4, Line 21, delete "$X_{Nc}$)." and insert -- $x_{Nc}$). --, therefor.

In Column 5, Line 18, delete "(($N_cN_{pc}$)" and insert -- (($N_c/N_{pc}$) --, therefor.

In Column 9, Line 42, delete "$X_{Nc}$" and insert -- $x_{Nc}$ --, therefor.

In Column 12, Line 31, delete "($N_cN_{pc}$)" and insert -- ($N_c/N_{pc}$) --, therefor.

In Column 13, Line 10, delete "($N_cN_{pc}$)" and insert -- ($N_c/N_{pc}$) --, therefor.

In the Claims

In Column 17, Line 29, in Claim 1, delete "are sum" and insert -- are a sum --, therefor.

In Column 18, Line 29, in Claim 10, delete " $\zeta b_{Npc}^{(n+1)} = \zeta b_{Npc}^{(n)} \exp[(j2\pi b_{Npc}^{(n)} - 1)\Delta f T_1]$ " and insert -- $\zeta b_{Npc}^{(n+1)} = \zeta b_{Npc}^{(n)} \exp[(j2\pi b_{Npc}^{(n)} - 1)\Delta f T_1]$, --, therefor.

In Column 19, Line 45, in Claim 18, delete " $\zeta b_{Npc}^{(n+1)} = \zeta b_{Npc}^{(n)} \exp[(j2\pi b_{Npc}^{(n)} - 1)\Delta f T_1]$ " and insert -- $\zeta b_{Npc}^{(n+1)} = \zeta b_{Npc}^{(n)} \exp[(j2\pi b_{Npc}^{(n)} - 1)\Delta f T_1]$, --, therefor.

Signed and Sealed this
Thirteenth Day of May, 2014

Michelle K. Lee
*Deputy Director of the United States Patent and Trademark Office*